United States Patent [19]

Byrd et al.

[11] Patent Number: 4,736,684

[45] Date of Patent: Apr. 12, 1988

[54] DELAYED QUICK CURE ROCKET MOTOR LINER

[75] Inventors: James D. Byrd; Robert T. Davis, both of Huntsville, Ala.

[73] Assignee: Thiokol Corporation, Chicago, Ill.

[21] Appl. No.: 820,578

[22] Filed: Jan. 16, 1986

Related U.S. Application Data

[63] Continuation of Ser. No. 579,221, Feb. 10, 1984.

[51] Int. Cl.$^4$ ............................................. C06B 21/00
[52] U.S. Cl. .................................................... 102/290
[58] Field of Search ............... 102/290; 149/19.2, 19.5, 149/19.9

[56] References Cited

U.S. PATENT DOCUMENTS

| 4,019,933 | 4/1977 | Cucksee et al. | 149/19.9 |
| 4,209,351 | 6/1980 | Pierce et al. | 102/290 |
| 4,304,185 | 12/1981 | Sayles | 149/19.2 |
| 4,429,634 | 2/1984 | Byrd et al. | 102/290 |
| 4,584,031 | 4/1986 | Graham et al. | 149/19.4 |
| 4,601,862 | 7/1986 | Byrd et al. | 102/290 |

Primary Examiner—Edward A. Miller
Attorney, Agent, or Firm—Gerald K. White; George Wheeler

[57] ABSTRACT

Improved composition, curable to form a rocket engine liner. The uncured liner composition has a long pot life and cures rapidly.

The composition comprises a hydroxyl terminated polybutadiene prepolymer; a diisocyanate curing agent for forming urethane linkages with said prepolymer; a trifunctional aziridine bond promoter; a filler; and a curing catalyst comprising maleic anhydride, magnesium oxide, and triphenyl bismuth.

2 Claims, No Drawings

DELAYED QUICK CURE ROCKET MOTOR LINER

The U.S. Government has a nonexclusive, nontransferable, royalty-free license to make, use or sell the claimed invention pursuant to Contract No. F06411-77-C-0028, awarded by the Department of the Air Force to Thiokol Corporation.

This is a continuation of co-pending application Ser. No. 579,221 filed on Feb. 10, 1984.

BACKGROUND OF THE INVENTION

The invention relates to an improved composition for use as a liner layer in a rocket motor. Rocket motors employing solid propellants typically comprise a rigid outer casing or shell; a heat insulating layer (insulation) bonded to all or part of the inner surface of the casing; a liner layer (liner) bonded to the insulating layer; and a solid propellant grain bonded to the liner. The insulation is generally fabricated from a composition capable of withstanding the high-temperature gases produced when the propellant grain burns, thus protecting the casing (or selected parts of it). The liner is an elastomeric composition which bonds the solid propellant grain to the insulation and to any uninsulated portions of the casing.

Improvements in propellant processing taught in U.S. Pat. Nos. 4,110,135 and 4,184,031, respectively issued to Graham et al. on Aug. 29, 1978 and Jan. 15, 1980, which patents are incorporated herein by reference, reduce the propellant cure time and increase its pot life. Thus, the propellant can be mixed, stored, and worked for relatively long periods of time without prematurely curing, but once the cure is initiated it proceeds rapidly to completion. Graham, et al. achieved these advantages by using a propellant binder system comprising hydroxyl-terminated polybutadiene based polyurethane (the reaction product of a hydroxyl terminated polybutadiene prepolymer and a polyisocyanate curing agent) and a curing catalyst comprising a mixture of magnesium oxide, maleic anhydride, and triphenyl bismuth.

SUMMARY OF THE INVENTION

The invention is a liner for a rocket motor, which differs from known liners in that a less expensive prepolymer is selected, a molar ratio of prepolymer to curing agent of about 1:1 is used, and the combination of magnesium oxide, maleic anhydride, and triphenyl bismuth is used as a curing catalyst.

Surprisingly, compared to the prior liner the present liner has about the same pot life, but much shorter pre-cure and cure times.

DESCRIPTION OF THE PREFERRED EMBODIMENT

Compositions curable to form a lining for a rocket motor comprise the reaction product of a hydroxyl terminated polybutadiene prepolymer (preferably about 40% of a material equivalent to that sold under the trademark R-45 HT by Arco Chemical Company, Philadelphia, Pa., less preferably a similar material sold by Arco as R-45M); an isocyanate curing agent (preferably about 13% of a material equivalent to that sold under the trademark DDI DIISOCYANATE available from General Mills Chemicals, Inc., Minneapolis, Minn.) which will react with the prepolymer to form a urethane linkage; a curing catalyst comprising about 0.4% of a mixture of maleic anhydride, magnesium oxide, triphenyl bismuth, preferably in about equal parts by weight; bond promoters (preferably about 4% of a trifunctional aziridine such as trimesoyl 1-(2-ethyl)aziridine, sold under the trademark HX-868 by 3M Company, Minneapolis, Minn.; and one or more fillers, preferably about 40% carbon black. Other ingredients may also be added to the reaction product.

The temperature employed in blending and liner fabrication will desirably be low enough to assure that the cure reaction is not prematurely accelerated but high enough to maintain all ingredients in a homogeneous liquid state with a low enough viscosity to permit mechanical transfer and application. The compositions should have a fairly long pot life to permit all the blended material to remain homogeneous during manipulation. Once the liner is in place, it should be maintained at a high enough temperature to assure an expeditious cure. However, if the cure proceeds at an excessive temperature, distortion of the cured liner or propellant (due to induced thermal stresses) may occur, or the temperatures of some parts of the liner and propellant may vary, resulting in an irregular cure. Thus, the preferred curing temperature for use herein is from about 145 to about 170 degrees Fahrenheit (63° to 77° Celsius).

EXAMPLE I

PREPARATION OF LINER COMPOSITIONS

Liner compositions having the composition set forth in Table I are prepared; all quantities in Table I are by weight.

TABLE I

| Material | FORMULATION (PARTS BY WEIGHT) | |
|---|---|---|
| | TL-H763A | TL-H755A (Control) |
| R-45M | — | 41.85 |
| R-45HT | 43.086 | — |
| DDI diisocyanate | 12.509 | 12.15 |
| HX 868 | 4.000 | 6.00 |
| Carbon Black | 40.000 | 40.00 |
| Magnesium Oxide | 0.135 | — |
| Maleic anhydride | 0.135 | — |
| Triphenyl bismuth | 0.135 | — |
| TOTAL | 100.000 | 100.00 |

The liner compositions are made as follows. All the ingredients except carbon black are put in the mixing bowl of a vertical dough mixer or other suitable mixer and blended thoroughly. The carbon black is then slowly added while the mixer runs. After all ingredients have been added, mixing is continued at a vacuum of about 28 inches of mercury (an absolute pressure of about 65 millibars) for about 30 minutes. The mixer is then stopped, any material adhering to the mixing bowl or impellers is scraped into the mass being mixed, and the mixer is run 15 minutes longer.

Pot life of the liner compositions is defined here as the amount of time required for a freshly mixed sample of the liner material to reach a selected final viscosity when stored at about 77° F. (25° C.). The selected final viscosity is about 12 Kilopoise (Kp) in this example. Viscosity is measured with a Brookfield Viscometer. The TL-H763A liner material according to the present invention increases in viscosity as set forth in Table II.

TABLE II

| TL-H763A POT LIFE | |
| --- | --- |
| Hours | Viscosity (Kp) |
| 0 | 0.60 |
| 2 | 0.70 |
| 5 | 0.95 |
| 7 | 1.20 |
| 25 | 3.10 |
| 30 | 3.70 |
| 32 | 4.00 |
| 49 | 12.40 |

Based on graphical interpolation, the pot life of TL-H763A is about 49 hours. By comparison, formulation TL-H755A has an estimated pot life under the same conditions of about 50 hours. These pot lives are provided for comparison purposes only, as the a particular liner composition's pot life in practice depends upon the selected coating conditions, coating equipment, and other factors.

Curing time as defined herein has two parts. The first part is the time required for the Penetrometer reading for a sample of liner material to drop from an initial high value to 12.5 mm. This interval is the precure time. The second part of curing time is the time required for the Penetrometer reading to drop from 12.5 mm to about 5 mm. This is the final cure time. Curing times can be measured at various temperatures. Cure time defined as above is only an approximation made for comparison purposes, as the completion of curing is more precisely determined by measuring the tensile properties of the composition.

The TL-763A material cures as shown in Table III below, which reports curing data at 77° F. (25° C.) and 145° F. (63° C.).

TABLE III

| TL-763A CURING TIME | | |
| --- | --- | --- |
| Hours | Penetrometer (25° C.) | Penetrometer (63° C.) |
| 5 | — | 22.5 mm |
| 5.5 | — | 8.70 |
| 6 | — | 6.20 |
| 23 | — | 1.30 |
| 30 | 34.6 mm | — |
| 54 | 19 | — |
| 55 | 16 | — |
| 57 | 13 | — |
| 58 | 6.5 | — |
| 77 | 3.9 | — |
| 79 | 3.0 | — |
| 101.5 | 1.2 | — |

By graphical analysis and interpolation of the data of Table III, the time required to precure to 12.5 mm Penetrometer is found to be 5.5 hours at 145° F. (63° C.) and 58 hours at 77° F. (25° C.). The final cure time (Penetrometer reading drops from 12.5 mm to 5.0 mm) is 1.0 hours at 145° F. (63° C.) and 16 hours at 77° F. (25° C.). This data illustrates that heat, such as a temperature of at least 135° F. (57° C.), activates the catalyst and thus hastens curing, while at room temperature compositions according to the present invention can have a long holding time without curing prematurely.

The prior composition—TL-H755A—has a precure time of about 24 hours at 145° F. (63° C.) and a final cure time of about 168 hours at 145° F. (63° C.).

EXAMPLE II

PREPARATION OF ROCKET MOTOR LINER

A rocket motor casing is sandblasted on its inside surface and solvent degreased, conventional insulation is applied and cured, and a conventional primer is applied to all exposed inside surfaces of the casing and insulation. Freshly prepared liner material according to formulation TL-H763A of Example I is then applied to the primed surface by sling coating, a procedure in which liner material is piped to a rotating head which travels axially within the casing, throwing liner material outward against the surfaces to be coated. (The head consists generally of a pair of axially spaced rotating disks. Liner material is fed between the disks, flows outwardly on their surfaces as it gains angular momentum, and finally is thrown from the disks.) The liner is applied at a uniform thickness of about 60 mils (1.55 mm).

Each lined casing is placed in a casting pit and precured for 4 to 6 hours at 145° F. (63° C.) at the same time the casing is preheated to receive the propellant grain. The propellant grain is cast adjacent to the liner, and the grain and liner are cocured at 170° F. (77° C.) until fully cured.

EXAMPLE III

ALTERNATE PREPARATION OF ROCKET MOTOR LINER

The procedure of Example II is followed, except that the liner is precured in a 145° F. (63° C.) oven, then held at room temperature (25° C.) for 7 days before the casing is again preheated and the propellant grain is cast. The liner and grain are then cocured.

In both Examples II and III, the tensile strength of the bond between the cured liner and propellant grain is found to be greater in almost every case than the internal cohesion of the liner or propellant, which is indicative of a strong bond between the liner and propellant grain.

What is claimed is:

1. A process of applying a rocket motor liner to an inside surface of a rocket motor casing by coating said casing with a rocket motor liner composition and then curing said liner composition; wherein the improvement comprises using a rocket motor liner composition comprising the product of a hydroxyl terminated polybutadiene prepolymer; a diisocyanate curing agent for forming urethane linkages with said prepolymer; a trifunctional aziridine bond promoter; a filler; and about 0.4% of a curing catalyst which is a mixture of maleic anhydride, magnesium oxide, and triphenyl bismuth in about equal parts by weight; wherein said liner composition has a pot life about the same as the pot life of a corresponding liner composition free of any curing catalyst.

2. The process of claim 1, wherein: said liner composition comprises:
 a. about 43% by weight of said prepolymer;
 b. about 12% of said curing agent;
 c. about 4% of said bond promoter;
 d. about 40% of said filler; and
 e. about 0.4% of said curing agent.

* * * * *